Sept. 15, 1953  S. E. GAIL  2,652,509
COMMUTATOR
Filed Dec. 19, 1951
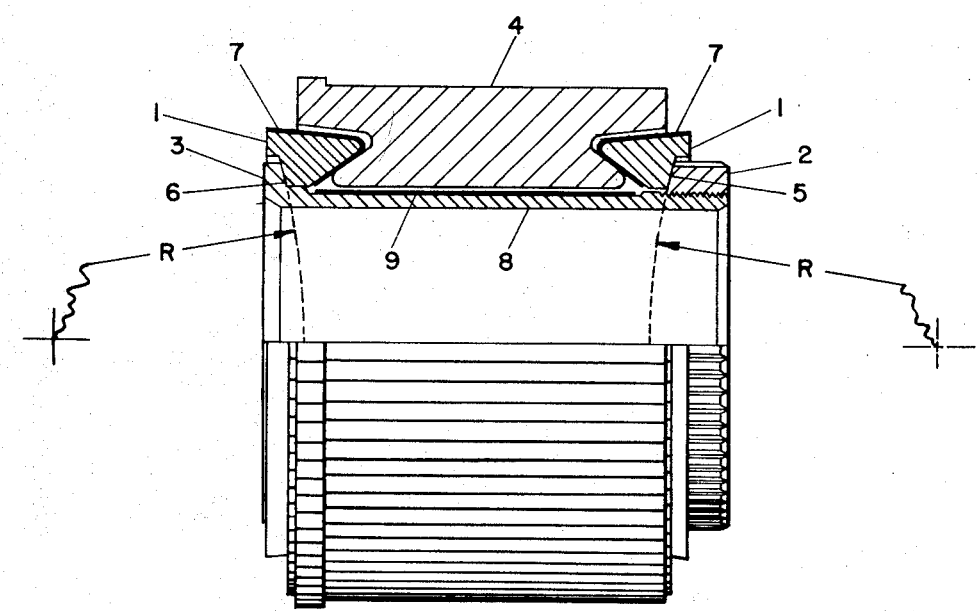
INVENTOR.
BY STEWART E. GAIL
ATTORNEY Patented Sept. 15, 1953

2,652,509

UNITED STATES PATENT OFFICE 2,652,509

COMMUTATOR

Stewart E. Gail, Maple Heights, Ohio, assignor to Jack & Heintz, Inc., Cleveland, Ohio, a corporation of Delaware Application December 19, 1951, Serial No. 262,379

5 Claims. (Cl. 310—236)

This invention relates in general to electric machine commutators employing a plurality of bars held in place by end clamping rings each of which has an inclined surface to engage a correspondingly inclined surface at each end of the commutator bars.

It is conventional practice to employ a commutator hub provided at one of its ends with a radially outwardly extending flange, collar or sleeve and provided at its other end with external screw threads to receive a clamping nut. The commutator bars are held between the end clamping rings and the end clamping rings are held between the sleeve and the clamping nut. The tightening of the clamping nut not only clamps the end clamping rings and the commutator bars against longitudinally displacement, but through the end clamping rings, also clamps the commutator bars radially inwardly toward the hub. The usual procedure, however, is to have the inner faces of the hub sleeve and clamping nut radially straight to engage correspondingly radially straight outside faces of the two end clamping rings. The resultant is a surface that is essentially a part of a sphere of infinite radius located internally of the commutator and along its center line. This leaves it possible for the end clamping rings to move radially with respect to the nut or sleeve by the amount of the radial clearance between the two concentric parts. On occasion of shock or similar force, it is possible that a shift will result of the commutator proper, with resulting excessive run out for proper operation.

It is therefore one of the primary objects of my invention to provide a new and novel means for clamping the commutator bars that will provide radial stability of the commutator assembly and render it virtually impossible to obtain a radial shift of the rings or commutator bars with respect to the sleeve and clamping nut without a change in the axial distance between the two rings.

Another object is to provide one or both of the two end rings with outer inclined surfaces and either the sleeve and nut or both with matching inclined inner surfaces that are either conical, or spherical, the inclination of such matching inclined surfaces being at such an angle as to form a component part of an arc of curvature of finite radius relative to a center of curvature that is external with respect to the center line, or axis, of the commutator so as to provide a maximum resistance of radial movement of the rings or commutator bars, or movement comparable to a ball and socket-joint movement which would result if the center of the curvature were internal with respect to the center line of the commutator.

With the foregoing and other objects in view, the invention resides in the combination of parts and in the details of construction hereinafter set forth in the following specification and appended claims, a certain embodiment thereof being illustrated in the accompanying drawing which is a view partly in side elevation and partly in longitudinal section, showing one form that my invention may take.

Referring more particularly to the drawing, the commutator bars 4 are shown to have their two ends slotted to receive end clamping rings 1 having inner inclined surfaces to match the inclined surfaces of the slotted ends of the bars. The bars and the end rings are insulated by strips, or cones, 7 of mica, or other suitable material. Bars 4 are also insulated from the commutator hub 8 by strips 9 of mica, or the like. The hub 8 is shown to have its inner end provided with a radially outwardly extending flange, collar or sleeve 3 to bear against the outer surface of the inner ring 1, and its outer clamping ring 1.

I have found that if the outer surfaces of the two end rings and the abutting inner surfaces of the sleeve and nut are radially straight, it is possible that a radial movement of the commutator rings will occur with respect to the nut or sleeve by the amount of the radial clearance between the concentric parts, resulting in excessive run out for proper commutator operation.

In order to avoid this, I provide the outer surface of the outer ring 1 and the inner surface of the nut 2 with corresponding angles of such radial inclination as to form a component part of a cone, or a sphere, and a component part of an arc of curvature of finite radius relative to a center of curvature that is external with respect to the commutator, the matching inclined surfaces being indicated at 5 as being in abutment throughout their radial length and the external radius being indicated in broken lines at R. I similarly form the engaging surfaces 6 of the inner face of the hub sleeve 3 and the outer face of the inner ring 1. I find that upon tightening of the clamping nut 2 in my construction I obtain the maximum resistance to any radial movement of the commutator rings with respect to the nut or sleeve and that it is virtually impossible to obtain any radial shifting of the rings without a change in the axial distance between the two end clamping rings. In view of the fact that in a properly assembled commutator these rings are seated in the commutator bar and insulating cones in a rock hard condition, any further reduction in the axial distance between the two end clamping rings is a virtual impossibility.

I claim:

1. In combination in an electric machine commutator having a hub provided at its inner end with a radially outwardly extending flange and provided at its outer end with screw threads to receive a clamping nut, a plurality of longitudinally extending commutator bars arranged circumferentially around said hub, the two ends of each of said bars having a slot therein to form an end surface that is inclined radially inwardly with respect to said bars, a pair of end clamping rings carried by said hub and between the ends of said bars and its respective flange and clamping nut and having inner faces inclined to engage and substantially match the inclined end surfaces of said bars, the outer surfaces of said clamping rings and the inner surfaces of said flange and clamping nut being inclined radially outwardly and longitudinally outwardly with respect to the ends of said bars and at such matching angles of inclination and elongated surface contact as to effectively form a component part of an arc of curvature of finite radius having a center of curvature that is external with respect to said commutator, so that a tightening of said clamping nut is adapted to clamp said clamping rings and commutator bars against longitudinal movement and to exert a radial component of force on said clamping rings and said commutator bars to resist radial displacement between said commutator bars and said hub.

2. In combination in an electric machine commutator having a hub provided at its one end with a radially outwardly extending flange and provided at its other end with screw threads to receive a clamping nut, a plurality of longitudinally extending commutator bars arranged circumferentially around said hub, the two ends of each of said bars having a slot therein to form an end surface that is inclined radially inwardly with respect to said bars, a pair of end clamping rings carried by said hub and between the ends of said bars and its respective flange and clamping nut and having inner faces inclined to engage and substantially match the inclined end surfaces of said bars, the engaging and matching clamping ring outer surfaces and the flange and clamping nut inner surfaces being inclined radially outwardly and longitudinally outwardly with respect to the ends of said bars and at such an angle of inclination and elongated surface contact as to effectively form a component part of an arc of curvature of finite radius having a center of curvature that is external with respect to said commutator, so that a tightening of said clamping nut is adapted to clamp said clamping rings and commutator bars against longitudinal movement and to exert a radial component of force on said clamping rings and said commutator bars to resist radial displacement between said commutator bars and said hub.

3. In combination in an electric machine commutator having a hub provided at its one end with a radially outwardly extending rigid member and provided at its other end with screw threads to receive a clamping member, a plurality of longitudinally extending commutator bars arranged circumferentially around said hub, the two ends of each of said bars having a slot therein to form an end surface that is inclined radially inwardly with respect to said bars, a pair of end clamping rings carried by said hub and between the ends of said bars and its respective rigid member and clamping member and having inner faces inclined to engage and substantially match the inclined end surfaces of said bars, the engaging and matching clamping ring outer surfaces and the rigid member and clamping member inner surfaces being inclined radially outwardly and longitudinally outwardly with respect to the end of said bars and at such an angle of inclination and elongated surface contact as to effectively form a component part of an arc of curvature of finite radius having a center of curvature that is external with respect to said commutator, so that a tightening of said clamping member is adapted to clamp said clamping rings and commutator bars against longitudinal movement and to exert a radial component of force on said clamping rings and said commutator bars to resist radial displacement between said commutator bars and said hub.

4. In combination in an electric machine commutator having a hub provided at its one end with a radially outwardly extending rigid member and provided at its other end with screw threads to receive a clamping member, a plurality of longitudinally extending commutator bars arranged circumferentially around said hub, the two ends of each of said bars having a slot therein to form an end surface that is inclined radially inwardly with respect to said bars, a pair of end clamping rings carried by said hub and between the ends of said bars and its respective rigid member and clamping member and having inner faces inclined to engage and substantially match the inclined end surfaces of said bars, the engaging and matching clamping ring outer surfaces and the rigid member and clamping member inner surfaces being inclined radially outwardly and longitudinally outwardly with respect to the ends of said bars and at such an angle of inclination and elongated surface contact as to effectively form a component part of an arc of curvature of finite radius having a center of curvature that is external with respect to said commutator.

5. In combination in an electric machine commutator having a hub provided at its one end with a radially outwardly extending rigid member and provided at its other end with screw threads to receive a clamping member, a plurality of longitudinally extending commutator bars arranged circumferentially around said hub, the two ends of each of said bars having end surfaces that are inclined radially inwardly with respect to said bars, a pair of end clamping rings carried by said hub and between the ends of said bars and its respective rigid member and clamping member and having inner faces inclined to engage and substantially match the inclined end surfaces of said bars, the engaging and matching clamping ring outer surfaces and the rigid member and clamping member inner surfaces being inclined radially outwardly and longitudinally outwardly with respect to the ends of said bars and at such an angle of inclination and elongated surface contact as to effectively form a component part of an arc of curvature of finite radius having a center of curvature that is external with respect to said commutator, so that a tightening of said clamping nut is adapted to clamp said clamping rings and commutator bars against longitudinal movement and to exert a radial component of force on said clamping rings and said commutator bars to resist radial displacement between said commutator bars and said hub.

STEWART E. GAIL.

References Cited in the file of this patent

UNITED STATES PATENTS

| Number | Name | Date |
| --- | --- | --- |
| 2,221,571 | Brecht | Nov. 12, 1940 |

FOREIGN PATENTS

| Number | Country | Date |
| --- | --- | --- |
| 313,289 | Great Britain | June 13, 1929 |
| 676,524 | Germany | June 6, 1939 |